United States Patent [19]
Sommer

[11] Patent Number: 6,029,786
[45] Date of Patent: Feb. 29, 2000

[54] LUBRICATION SYSTEM FOR AN OIL SHEAR CLUTCH/BRAKE DRIVE

[75] Inventor: Gordon Maurice Sommer, Plymouth, Mich.

[73] Assignee: Midwest Brake Bond Company, Warren, Mich.

[21] Appl. No.: 09/026,647

[22] Filed: Feb. 20, 1998

[51] Int. Cl.[7] ................................................ F16D 13/72
[52] U.S. Cl. ............................ 192/18 A; 192/113.36; 192/70.12
[58] Field of Search ..................... 192/18 A, 113.36, 192/70.12, 18 B, 18 R

[56] References Cited

U.S. PATENT DOCUMENTS

| | | | |
|---|---|---|---|
| 1,702,116 | 2/1929 | Hoffman | 192/113.36 |
| 3,667,581 | 6/1972 | Hanks | 192/18 A |
| 3,713,517 | 1/1973 | Sommer | 192/18 A |
| 4,122,926 | 10/1978 | Spanke et al. | 192/18 A |
| 4,211,313 | 7/1980 | Quick et al. | 192/18 A X |
| 4,346,796 | 8/1982 | Ueno | 192/18 A |
| 4,396,100 | 8/1983 | Eltze | 192/113.36 X |
| 4,562,907 | 1/1986 | Maeda | 192/18 A |
| 4,693,350 | 9/1987 | Sommer | 192/18 A |
| 5,487,456 | 1/1996 | Sommer | 192/18 A |
| 5,538,121 | 7/1996 | Hering | 192/113.36 X |

FOREIGN PATENT DOCUMENTS

| | | | |
|---|---|---|---|
| 172739 | 9/1985 | Japan | 192/18 A |

Primary Examiner—Charles A. Marmor
Assistant Examiner—Ha Ho
Attorney, Agent, or Firm—Harness, Dickey & Pierce, PLC

[57] ABSTRACT

A clutch/brake drive has a brake unit and a clutch unit. The brake unit and clutch unit each include a plurality of interleaved friction plates. The lubrication for the clutch/brake unit includes a plurality of axial and redial passages formed into the friction plates of both the brake unit and the clutch unit. This ensures continuous and adequate supply of lubricant to the clutch and brake to reduce friction and remove generated heat.

13 Claims, 4 Drawing Sheets

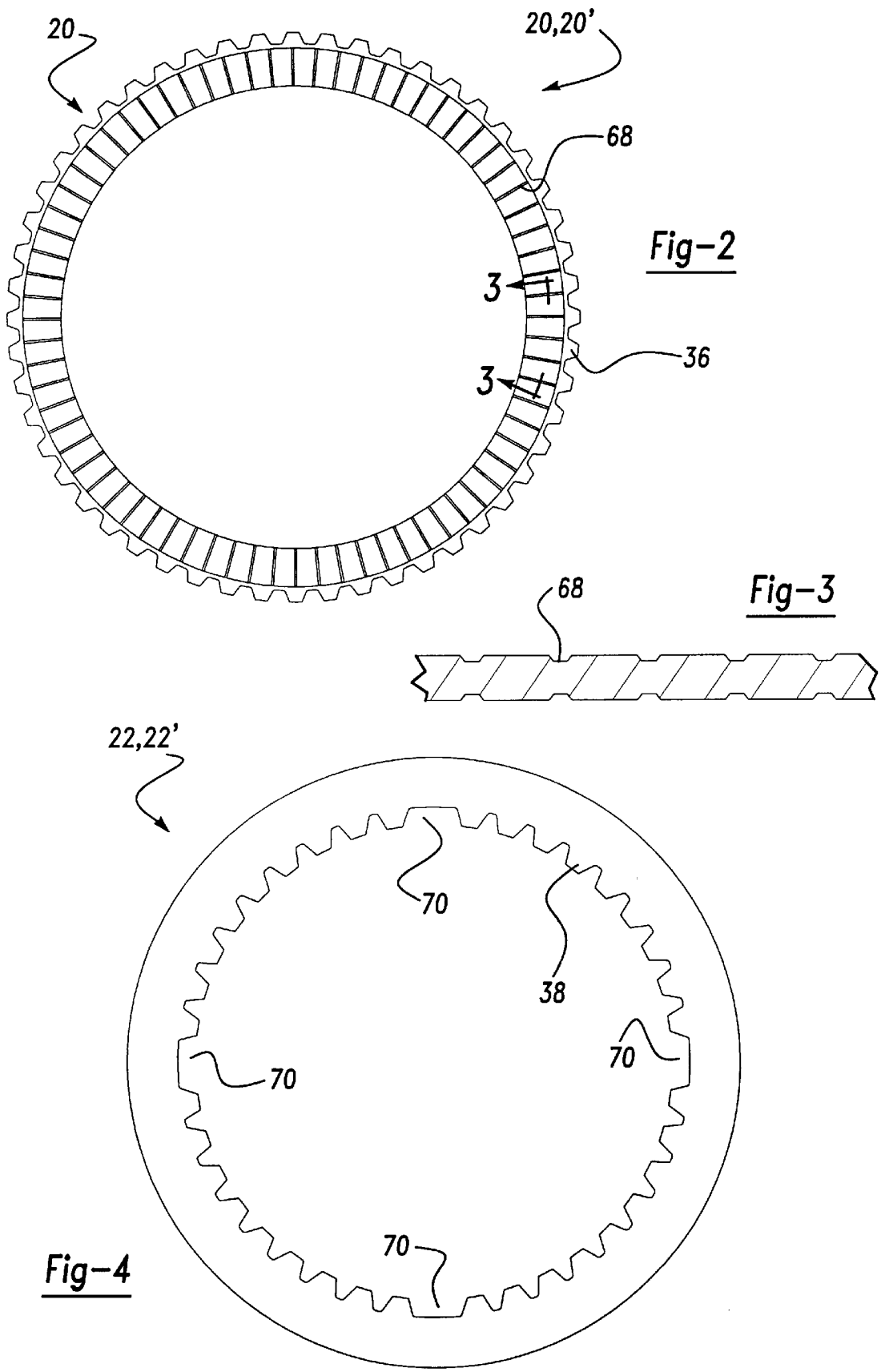

LUBRICATION SYSTEM FOR AN OIL SHEAR CLUTCH/BRAKE DRIVE

FIELD OF THE INVENTION

The present invention relates to a machine tool drive having an oil shear brake and/or clutch. More particularly, the present invention relates to a lubrication system for an oil shear clutch/brake drive which improves the oil flow within the drive to ensure a continuous supply of oil to the clutch and brake unit.

BACKGROUND OF THE INVENTION

Dry friction clutch/brakes depend upon the rubbing of a dry friction material against dry reaction members to start and stop a machine tool. This continuous dry rubbing causes wearing of both the friction material and the reaction members as well as causing the generation of heat in these members. The faster the machine tool operates and the faster the flywheel rotates, greater is the amount of wear and heat which are generated. This generation of wear and heat requires periodic gap adjustment between the friction plates and the reaction members to keep the clutch/brakes functioning and the machine tool operating correctly. The trip rate or cycle speed of a machine tool equipped with a dry friction clutch/brake unit is limited because the mass of the unit determines its heat dissipation capacity. If the mass of the unit is increased to increase its heat dissipation capacity, the inertia that must be started and stopped is also increased. These factors define a closed loop from which it is impossible to escape when trying to substantially increase the performance of the system.

Oil shear brake and clutch units have been developed to eliminate the problems associated with the dry friction type of units. The oil shear systems use hydraulic actuation instead of air actuation and the units have been developed with key modules which can be easily adapted to be mated with the various types of machine tools. Properly designed oil shear clutch/brake drives offer the advantage of little or no wear of plates in the disk stacks and no brake fade. This provides a more precise operation of the machine tool and dramatically increases machine tool up-time. The oil film between the adjacent disks carries the heat generated by the start-stops of the unit away from the disk stacks. This removal of heat offers the advantage that there is now no practical limit for the machine tool trip rate and the flywheel speed. In addition, this removal of heat provides unlimited inching capabilities.

While the oil shear clutch/brake drive units have significantly improved the operation of machine tool drives, they present totally new issues which must be addressed. One of these issues is providing an adequate supply of oil to the clutch and brake assemblies of the drive. Prior art lubrication systems supply oil to the inside portion of the drive (near the axis of rotation) and subsequently remove the oil from the outside portion of the drive. The rotation of the components of the drive and the associated centrifugal force acting on the oil in these prior art drives is thus in the direction of the oil flow. There is therefore, a tendency in the prior art to increase the flow rate of the oil. As long as a sufficient supply of lubricant is continuously supplied to the drive, these prior art drives perform satisfactorily. Should there be a momentary delay in the supply of oil to the inside portion of the drive, the friction plates which are located on the outside portion of the drive would be momentarily starved of oil. This starving of oil will result in the generation of heat and excessive wear of the friction plates.

Various designs have been developed in an attempt to eliminate this type of a problem. Prior art drives have been developed which reverse the direction of low of the oil. These prior art drives supply the oil to the outside portion of the drive and remove the oil near the axis of rotation or inside portion of the drive. The centrifugal force acting on the oil due to the rotation of various components of the drive is thus against the flow of the oil and these drives have proven to be more accommodating to a momentary delay in the supply of oil.

While reversing the flow of oil has significantly improved the performance of machine tool drives incorporating oil shear clutches and brakes, the continued development of lubrication systems for ensuring a continuous and adequate supply of lubricant to the friction plates of the clutch and brake assemblies.

SUMMARY OF THE INVENTION

The present invention provides the art with a machine tool drive having a unique lubrication system for the friction plates of the clutch and brake units of the drive. The lubrication system provides lubricating fluid to the outer portion of the brake unit. The friction plates of the brake and clutch unit are provided with radial and axial passages to route the lubricating fluid throughout the interfaces between the interior and exterior friction plates of the brake and clutch units.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 2 is a plan view of one of the exterior friction plates shown in FIG. 1;

FIG. 3 is an end view of the exterior friction plate shown in FIG. 2 showing one of the plurality of lubrication grooves;

FIG. 4 is a plan view of one of the interior friction plates shown in FIG. 1;

DETAILED DESCRIPTION OF THE PREFERRED EMBODIMENT

Figure 1:
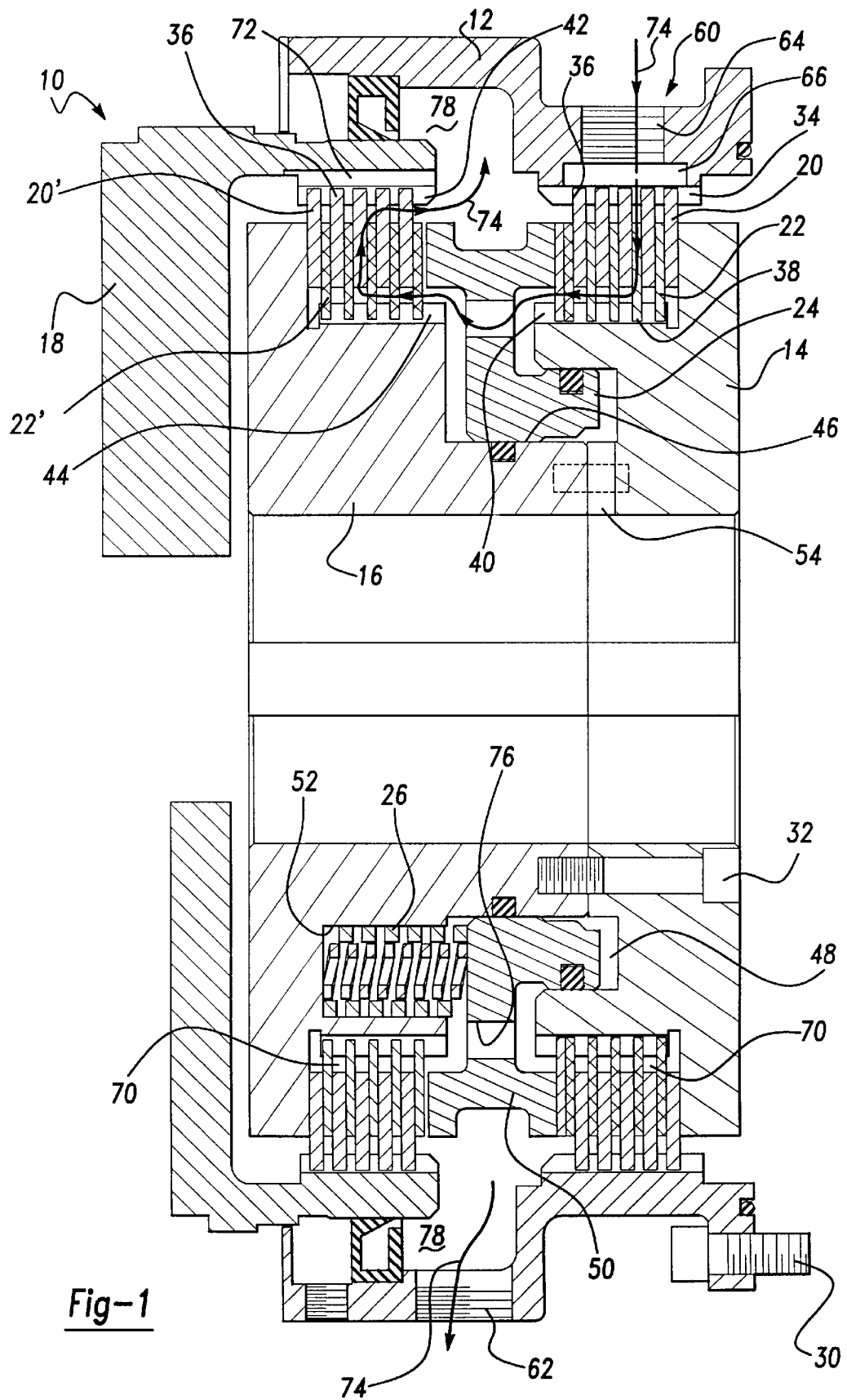
FIG. 1 is a cross-sectional side view of a clutch/brake drive incorporating the unique lubrication system in accordance with the present invention.

Referring now to the drawings in which like reference numerals designate like or corresponding parts throughout the several views, there is shown in FIG. 1, a clutch/brake unit in accordance with the present invention which is designated generally by the reference numeral 10. Clutch/brake unit 10 includes a brake housing 12, a brake hub 14, a clutch hub 16, a clutch ring 18, a plurality of exterior friction plates 20 and 20', a plurality of interior friction plates 22 and 22', a piston 24 and a plurality of biasing springs 26.

Brake housing 12 is attached to a stationary member of a machine tool (not shown) using a plurality of bolts 30 or by any other means known well in the art. Brake hub 14 is attached to clutch hub 16 using a plurality of bolts 32 or by any other means known well in the art. Both brake hub 14 and clutch hub 16 are attached to an input member (not shown) of the machine tool. The input member of the machine tool receives rotational motion from hubs 14 and 16 causing the machine tool to perform its designated operation. Housing 12 is mounted in a coaxial relationship with the input member of the machine tool and with hubs 14 and 16 such that hubs 14 and 16 rotate within housing 12. Clutch ring 18 is also mounted in a coaxial relationship with hubs 14 and 16 and is attached to a source of rotational input such as a flywheel (not shown). During operation of the machine tool, clutch ring 18 continuously rotates with the flywheel.

A first plurality of exterior friction plates 20 are attached to housing 12 using a spline 34 on housing 12 which mates with a spline 36 located on the outer circumference of exterior friction plates 20. Splines 34 and 36 located the first plurality of exterior friction plates 20 within housing 12 such that rotation with respect to housing 12 is prohibited but the first plurality of exterior friction plates 20 are allowed to move axially within housing 12. Interjected or interleaved between the first plurality of exterior friction plates 20 are a first plurality of interior friction plates 22. The first plurality of interior friction plates 22 include a spline 38 on their interior circumference which mates with a spline 40 located on brake hub 14. Splines 38 and 40 locate the first plurality of interior friction plates 22 within housing 12 such that rotation with respect to brake hub 14 is prohibited but the first plurality of interior friction plates 22 are allowed to move axially on brake hub 14. The first plurality of interior friction plates 22 thus rotate with brake hub 14.

A second plurality of exterior friction plates 20' are attached to clutch ring 18 using a spline 42 on clutch ring 18 which mates with spline 36 located on the outer circumference of exterior friction plates 20. Splines 42 and 36 locate the second plurality of exterior friction plates 20' within clutch ring 18 such that rotation with respect to clutch ring 18 is prohibited but the second plurality of exterior friction plates 20' are allowed to move axially within clutch ring 18. The second plurality of exterior friction plates 20' thus rotate with clutch ring 18. Interjected or interleaved between the second plurality of exterior friction plates 20' are a second plurality of interior friction plates 22'. Splines 38 on the interior circumference of the second set of interior friction plates 22' mate with a spline 44 located on clutch hub 16. Splines 38 and 44 locate the second set of interior friction plates 22' within clutch ring 18 such that rotation with respect to clutch hub 16 is prohibited but the second plurality of interior friction plates 22' are allowed to move axially on clutch hub 16. The second plurality of interior friction plates 22' thus rotate with clutch hub 16.

Piston 24 is located within a piston bore 46 formed by brake hub 14 and clutch hub 16. Piston 24 along with brake hub 14 and clutch hub 16 define a fluid chamber 48. Piston 24 includes an activation member 50 which is disposed between the first and second plurality of exterior and interior friction plates 20, 20' and 22, 22' respectively, as shown in FIG. 1. Piston 24 is axially movable within piston bore 46 between a first position (to the right in FIG. 1) where the first plurality of exterior and interior friction plates 20 and 22 are compressed (brake applied, clutch disengaged) and a second position (to the left in FIG. 1) where the second plurality of exterior and interior friction plates 20' and 22' are compressed (brake released, clutch engaged). The plurality of springs 26 are each disposed in a spring pocket 52 formed in clutch hub 16 and operate to bias piston 24 into its first position or to the right in FIG. 1.

The operation of clutch/brake unit 10 begins with unit 10 being positioned as shown in FIG. 1. Clutch ring 18 is rotating due to its connection to the driving mechanism or flywheel of the machine tool. The second plurality of exterior friction plates 20' are rotating with clutch ring 18 and with respect to the second plurality of interior friction plates 22' and clutch hub 16. (Clutch disengaged). The second plurality of exterior friction plates 20' are allowed to rotate with respect to the second plurality of interior friction plates 22' due to the biasing of piston 24 and activation member 50 to the right as shown in FIG. 1. The input member of the machine tool is being held stationary due to its connection with clutch hub 16 and brake hub 14. Hubs 14 and 16 are held stationary due to the first plurality of interior friction plates 22 being compressed against the first plurality of exterior friction plates 20 by the plurality of springs 26 biasing piston 24 and activation member 50 to the right as shown in FIG. 1. (Brake applied). The splined connection between the first plurality of interior friction plates 22 and brake hub 14 in conjunction with the splined connection between the first plurality of exterior friction plates 20 and housing 12, lock hubs 14 and 16, and thus the input member of the machine tool, to stationary housing 12.

When it is desired to cycle or operate the machine tool, machine pressurized fluid is supplied to chamber 48 through a port 54. Machine pressurized fluid within chamber 48 exerts a force on piston 24 which overcomes the biasing load being exerted on piston 24 by the plurality of springs 26 and piston 24 is moved to the left as shown in FIG. 1. The movement to the left of piston 24 releases the compressive load between the first plurality of exterior and interior friction plates 20 and 22 (brake released) and exerts a compressive load on the second plurality of exterior and interior friction plates 20' and 22' (clutch engaged). The release of compressive load between the first plurality of exterior and interior friction plates 20 and 22 permits rotation of the first plurality of interior friction plates 22 with respect to the first plurality of exterior friction plates 20 and thus permitting the rotation of hubs 14 and 16 with respect to housing 12. The compressive load exerted by activation member 50 locks the second plurality of interior friction plates 22' to the second plurality of exterior friction plates 20'. The spine connections between clutch hub 16 and the second plurality of interior friction plates 22 in conjunction with the spline connections between clutch ring 18 and the second plurality of exterior friction plates 20' cause hubs 16 and 14 to rotate with clutch ring 18 driven by the output member or flywheel of the machine tool. Release of machine pressurized fluid from chamber 48 will cause clutch/brake unit 10 to move back to the position shown in FIG. 1 or its starting position.

Figure 5:
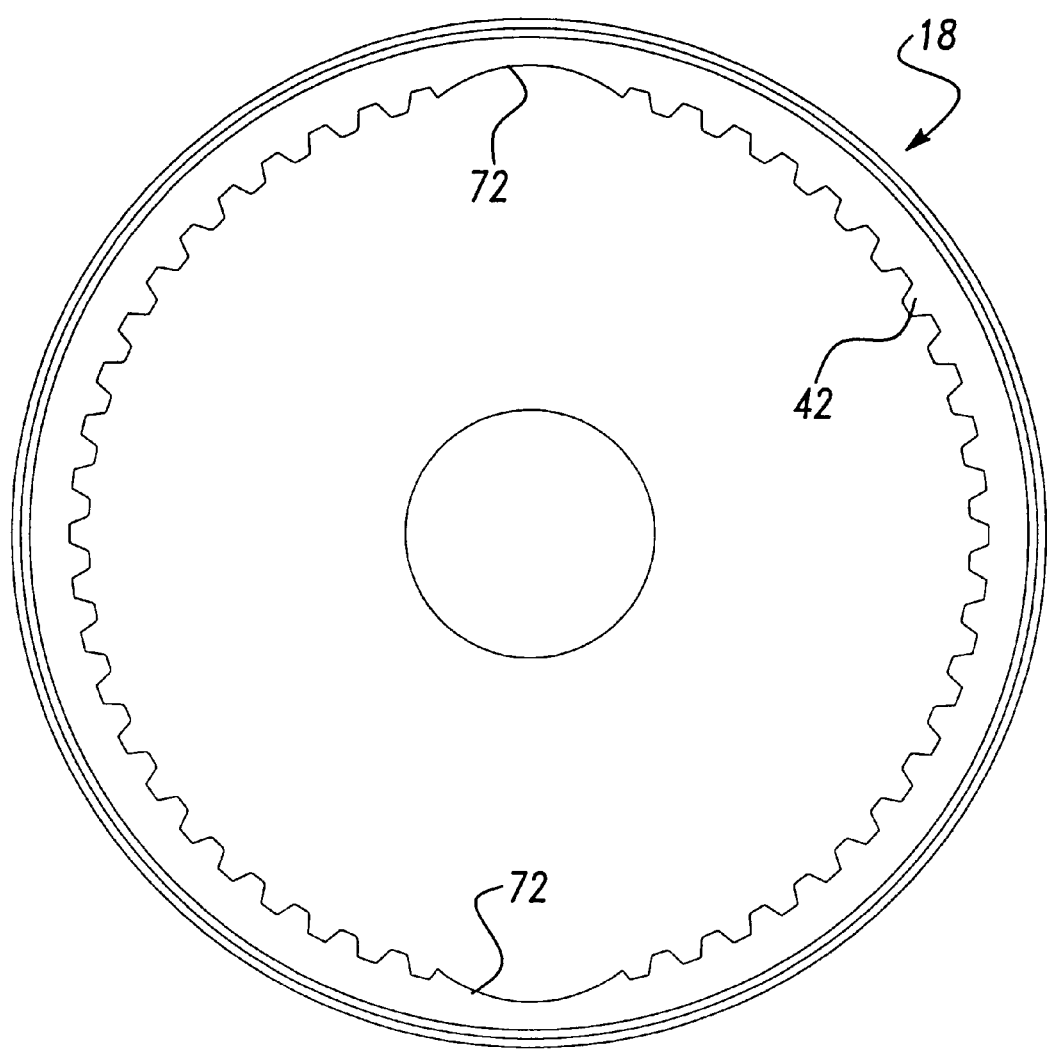
FIG. 5 is a plan view of the clutch ring shown in FIG. 1.

The present invention is directed towards a unique lubrication system which provides a continuous supply of lubricating fluid to the first and second plurality of exterior and interior friction plates, 20' and 22'. Housing 12 defines a lubricant inlet 60 and a lubricant outlet 62. Inlet 60 includes a threaded portion 64 and an arcuate notched portion 66 for providing lubricant to clutch/brake unit 10. Each of the plurality of exterior friction plates, 20' are provided with a plurality of radially extending passages 68. (See FIGS. 2 and 3). Passages 68 extend entirely across the contact area of exterior friction plates, 20'. Each of the plurality of interior friction plates, 22' have four splines symmetrically located around the inner circumference of interior friction plates, 22' eliminated to define four lubrication passages 70. (See FIG. 4). Clutch ring 18 defines a pair of arcuate notches 72 which extend into splines 42 providing a fluid passage for the lubricating oil. (See FIG. 5).

Referring now to FIG. 1, the fluid flow for lubricating oil for reducing friction and providing cooling is depicted by arrows 74. Lubricating fluid is supplied to inlet 60 from a source of lubricating fluid (not shown). The lubricating fluid flows through threaded portion 64, through arcuate notched portion 66 and radially inward into the interface between the first plurality of exterior and interior friction plates 20 and 22 through the plurality of passages 68 defined by the first plurality of exterior friction plates 20. The rotational movement of brake hub 14 during operation of clutch/brake unit 10 will circumferentially distribute the lubricating fluid. The lubricating fluid flows radially inward through passages 68 and then travels axially to the left as shown in FIG. 1 through passages 70 defined by the first plurality of interior friction plates 22. The lubricant continues its axial flow through a plurality of lubricant bores 76 extending through piston 24 and enters passages 70 defined by the second plurality of interior friction plates 22'. The fluid flow then turns radially outward through the plurality of passages 68 defined by the second plurality of exterior friction plates 20'. The centrifugal force exerted on the lubricant due to the continued rotation of the second plurality of exterior friction plates 20 improves the flow of lubricant radially outward. Fluid flow from passages 68 defined by the second plurality of exterior friction plates 20' flows into arcuate notches 72 defined by clutch ring 18 and from notches 72 into an annular chamber 78 which is in communication with outlet 62. Lubricating fluid enters outlet 62 from notches 72 and returns to the source of lubricating fluid for cleaning and/or cooling prior to again being supplied to inlet 60.

Thus, lubricant flow is directed through passages defined by the components of the drive (exterior and interior friction plates 20, 22' and 22') which require lubrication for reducing friction and removing heat. By directing the lubricant flow directly into the interface between the friction plates, an improved lubrication system has been developed which ensures an adequate supply of lubricating fluid is always available for clutch/brake unit 10.

Figure 6:
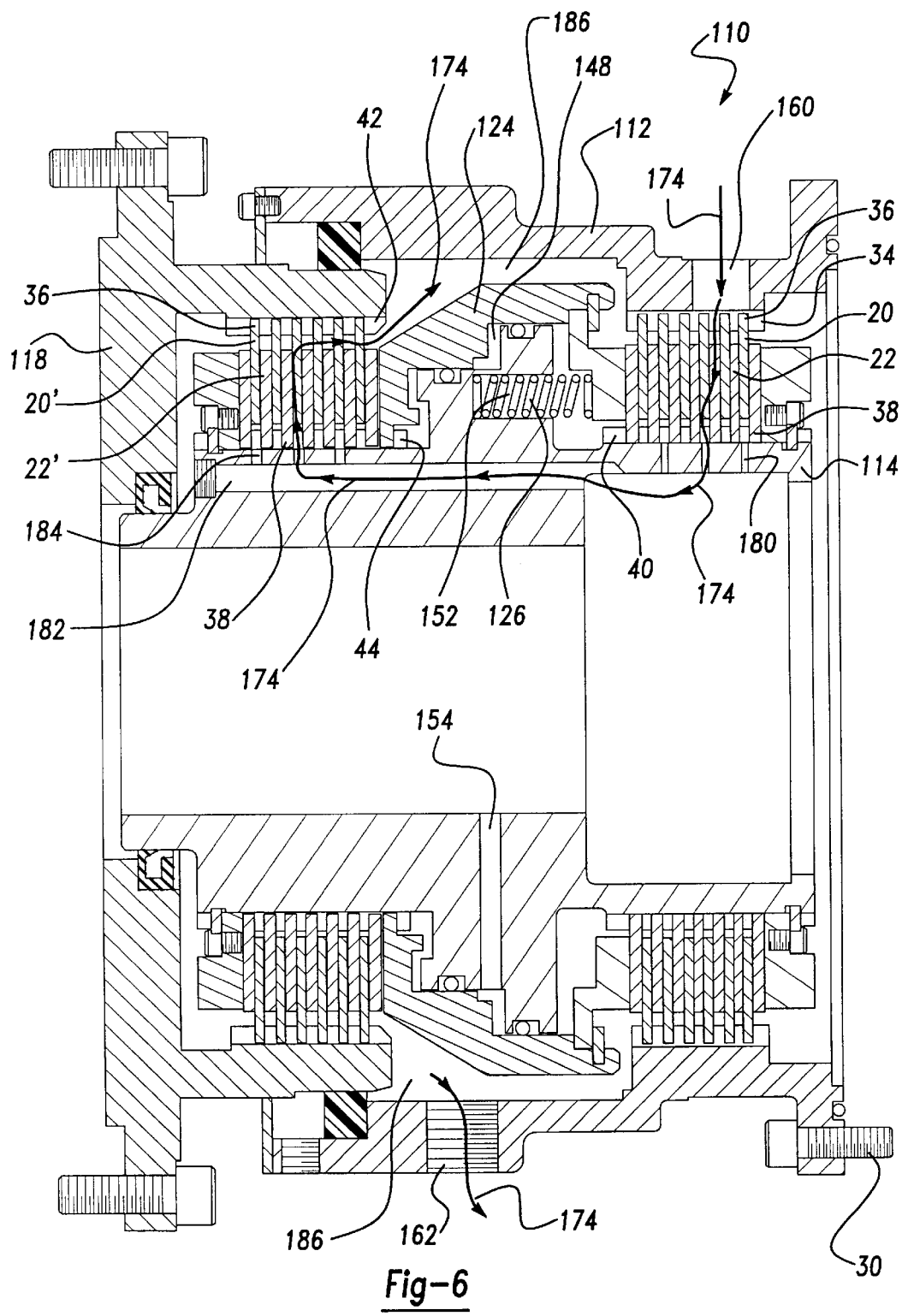
FIG. 6 is a cross-sectional side view of a clutch/brake drive in accordance with another embodiment of the present invention.

Referring now to FIG. 6, a clutch/brake unit is shown in accordance with another embodiment of the present invention which is designated generally by the reference numeral 110. Clutch/brake unit 110 includes a brake housing 112, a brake/clutch hub 114, a clutch ring 118, the plurality of exterior friction plates 20 and 20' the plurality of interior friction plates 22 and 22' piston 124 and a plurality of biasing springs 126.

Brake housing 112 is attached to a stationary member of a machine tool (not shown) using the plurality of bolts 30 or by any other means known well in the art. Brake/clutch hub 114 is attached to an input member (not shown) of the machine tool. The input member of the machine tool receives rotational motion from hub 114 causing the machine tool to perform its designated operation. Housing 112 is mounted in a coaxial relationship with the input member of the machine tool and with hub 114 such that hub 114 rotates within housing 112. Clutch ring 118 is also mounted in a coaxial relationship with hub 114 and is attached to a source of rotational input such as a flywheel (not shown). During operation of the machine tool, clutch ring 118 continuously rotates with the flywheel.

The first plurality of exterior friction plates 20 are attached to housing 112 using spline 34 on housing 112 which mates with the spline 36 located on the outer circumference of exterior friction plates 20. Splines 34 and 36 located the first plurality of exterior friction plates 20 within housing 112 such that rotation with respect to housing 112 is prohibited but the first plurality of exterior friction plates 20 are allowed to move axially within housing 112. Interjected or interleaved between the first plurality of exterior friction plates 20 are the first plurality of interior friction plates 22. The first plurality of interior friction plates 22 include spline 38 on their interior circumference which mates with spline 40 located on brake/clutch hub 114. Splines 38 and 40 locate the first plurality of interior friction plates 22 within housing 112 such that rotation with respect to brake/clutch hub 114 is prohibited but the first plurality of interior friction plates 22 are allowed to move axially on brake/clutch hub 114. The first plurality of interior friction plates 22 thus rotate with brake/clutch hub 114.

The second plurality of exterior friction plates 20' are attached to clutch ring 118 using spline 42 on clutch ring 118 which mates with spline 36 located on the outer circumference of exterior friction plates 20'. Splines 42 and 36 locate the second plurality of exterior friction plates 20' within clutch ring 118 such that rotation with respect to clutch ring 118 is prohibited but the second plurality of exterior friction plates 20 are allowed to move axially within clutch ring 118. The second plurality of exterior friction plates 20' thus rotate with clutch ring 118. Interjected or interleaved between the second plurality of exterior friction plates 20' are the second plurality of interior friction plates 22'. Splines 38 on the interior circumference of the second set of interior friction plates 22' mate with spline 44 located on brake/clutch hub 114. Splines 38 and 44 locate the second set of interior friction plates 22' within clutch ring 118 such that rotation with respect to brake/clutch hub 114 is prohibited but the second plurality of interior friction plates 22' are allowed to move axially on brake/clutch hub 114. The second plurality of interior friction plates 22' thus rotate with brake/clutch hub 114.

Piston 124 is located coaxially with brake/clutch hub 114. Piston 124 along with brake/clutch hub 114 define a fluid chamber 148. Piston 124 is axially movable with respect to brake/piston hub 114 between a first position (to the right in FIG. 6) where the first plurality of exterior and interior friction plates 20 and 22 are compressed (brake applied, clutch disengaged) and a second position (to the left in FIG. 6) where the second plurality of exterior and interior friction plates 20' and 22' are compressed (brake released, clutch engaged). The plurality of springs 126 are each disposed in a spring pocket 152 formed in brake/clutch hub 114 and operate to bias piston 124 into its first position or to the right in FIG. 6.

The operation of clutch/brake unit 110 begins with unit 110 being positioned as shown in FIG. 6. Clutch ring 118 is rotating due to its connection to the driving mechanism or flywheel of the machine tool. The second plurality of exterior friction plates 20' are rotating with clutch ring 18 and with respect to the second plurality of interior friction plates 22' and brake/clutch hub 114. (Clutch disengaged). The second plurality of exterior friction plates 20' are allowed to rotate with respect to the second plurality of interior friction plates 22' due to the biasing of piston 124 to the right as shown in FIG. 6. The input member of the machine tool is being held stationary due to its connection with brake/clutch hub 114. Hub 114 is held stationary due to the first plurality of interior friction plates 22 being compressed against the first plurality of exterior friction plates 20 by the plurality of springs 126 biasing piston 124 to the right as shown in FIG. 6. (Brake applied). The splined connection between the first plurality of interior friction plates 22 and brake/clutch hub 114 in conjunction with the splined connection between the first plurality of exterior friction plates 20 and housing 112, lock hub 114, and thus the input member of the machine tool, to stationary housing 112.

When it is desired to cycle or operate the machine tool, pressurized fluid is supplied to chamber 148 through a port 154. Pressurized fluid within chamber 148 exerts a force on piston 124 which overcomes the biasing load being exerted on piston 124 by the plurality of springs 126 and piston 124 is moved to the left as shown in FIG. 6. The movement to the left of piston 124 releases the compressive load between the first plurality of exterior and interior friction plates 20 and 22 (brake released) and exerts a compressive load on the second plurality of exterior and interior friction plates 20' and 22' (clutch engaged). The release of compressive load between the first plurality of exterior and interior friction plates 20 and 22 permits rotation of the first plurality of interior friction plates 22 with respect to the first plurality of exterior friction plates 20 and thus permitting the rotation of hub 114 with respect to housing 112. The compressive load exerted by piston 124 locks the second plurality of interior friction plates 22' to the second plurality of exterior friction plates 20'. The spine connections between brake/clutch hub 114 and the second plurality of interior friction plates 22' in conjunction with the spline connections between clutch ring 118 and the second plurality of exterior friction plates 20' cause hub 114 to rotate with clutch ring 118 driven by the output member or flywheel of the machine tool. Release of pressurized fluid from chamber 148 will cause clutch/brake unit 110 to move back to the position shown in FIG. 6 or its starting position.

This embodiment of the present invention is also directed towards a unique lubrication system which provides a continuous supply of lubricating fluid to the first and second plurality of exterior and interior friction plates 20 and 22. Housing 112 defines a lubricant inlet 160 and a lubricant outlet 162. Each of the plurality of exterior friction plates 20 are provided with the plurality of radially extending passages 68. (See FIGS. 2 and 3). Passages 68 extend entirely across the contact area of exterior friction plates 20. Each of the plurality of interior friction plates 22 have four splines symmetrically located around the inner circumference of interior friction plates 22 eliminated to define four lubrication passages 70. (See FIG. 4). While clutch/drive unit 10 is being described having friction plates 22 with lubrication passages 70, its is within the scope of the present invention to eliminate passages 70 and have continuous splines 38 within the interior of plates 22 if desired.

Referring now to FIG. 6, the fluid flow for lubricating oil for reducing friction and providing cooling is depicted by arrows 174. Lubricating fluid is supplied to inlet 160 from a source of lubricating fluid (not shown). The lubricating fluid flows through inlet 160 and radially inward into the interface between the first plurality of exterior and interior friction plates 20 and 22 through the plurality of passages 68 defined by the first plurality of exterior friction plates 20. The rotational movement of brake/clutch hub 114 during operation of clutch/brake unit 110 will circumferentially distribute the lubricating fluid. The lubricating fluid flows radially inward through passages 68 and then travels through a plurality of passages 180 formed in brake/clutch hub 114 and then axially to the left as shown in FIG. 1 through a plurality of passages 182 defined by brake/clutch hub 114. The fluid flow then turns radially outward through a plurality of passages 184 in bake/clutch hub 114 and then through the plurality of passages 68 defined by the second plurality of exterior friction plates 20'. The centrifugal force exerted on the lubricant due to the continued rotation of the second plurality of exterior friction plates 20' improves the flow of lubricant radially outward. Fluid flow from passages 68 defined by the second plurality of exterior friction plates 20' flows into a cavity 186 which is in communication with outlet 162. Lubricating fluid exits outlet 162 and returns to the source of lubricating fluid for cleaning and/or cooling prior to again being supplied to inlet 160.

Thus, lubricant flow is directed through passages defined by the components of the drive (exterior and interior friction plates 20, 20' and 22, 22') which require lubrication for reducing friction and removing heat. By directing the lubricant flow directly into the interface between the friction plates, an improved lubrication system has been developed which ensures an adequate supply of lubricating fluid is always available for clutch/brake unit 110.

While the above detailed description describes the preferred embodiment of the present invention, it should be understood that the present invention is susceptible to modification, variation and alteration without deviating from the scope and fair meaning of the subjoined claims.

What is claimed is:

1. A clutch/brake drive comprising:
   a housing having a fluid inlet and a fluid outlet, said fluid outlet being separated from said fluid inlet;
   a clutch ring rotatably disposed with respect to said housing;
   a hub rotatably disposed with respect to said housing;
   a brake disposed between said housing and said hub, said brake being movable between an applied condition where said hub is locked to said housing and a released condition where said hub can rotate with respect to said housing, said brake comprising a first plurality of friction plates alternately splined, respectively, to said housing and said hub;
   a clutch disposed between said hub and said clutch ring, said clutch being movable between an engaged condition where said hub is locked to said clutch ring and a disengaged condition where said clutch ring can rotate relative to said hub, said clutch comprising a second plurality of friction plates alternately splined, respectively, to said hub and said clutch ring; and
   a lubricant passage extending from said fluid inlet through said brake, through said clutch and to said fluid outlet, said lubricant passage being partially defined by said first and second plurality of friction plates, said lubricant passage directing lubricant flow serially from said fluid inlet radially inward through said first plurality of plates, then axially to said second plurality of friction plates then radially outward to said fluid outlet.

2. The clutch/brake unit according to claim 1 wherein, said lubricant passage is partially defined by a radial passage in said first plurality of friction plates.

3. The clutch/brake unit according to claim 2 wherein, said lubricant passage is partially defined by an axial passage in said first plurality friction plates.

4. The clutch/brake unit according to claim 1 wherein, said lubricant passage is partially defined by a first radial passage in said first plurality of friction plates and a second radial passage in said second plurality of friction plates.

5. The clutch/brake unit according to claim 4 wherein, said lubricant passage is partially defined by a first axial passage in said first plurality of friction plates and a second axial passage in said second plurality of friction plates.

6. The clutch/brake unit according to claim 1 wherein, said lubricant passage is partially defined by an axial passage in said first plurality friction plates.

7. The clutch/brake unit according to claim 1 wherein, said lubricant passage is partially defined by a first axial passage in said first plurality of friction plates and a second axial passage in said second plurality of friction plates.

8. The clutch/brake drive according to claim 1 wherein, said first plurality of friction plates comprise a plurality of exterior friction plates and a plurality of interior friction plates, said lubricant passage being partially defined by a radial passage in at least one of said plurality of exterior friction plates.

9. The clutch/brake unit according to claim 8 wherein, said lubricant passage is partially defined by an axial passage in at least one of said plurality of interior friction plates.

10. The clutch/brake drive according to claim 1 wherein, said first plurality of friction plates comprise a plurality of exterior friction plates and a plurality of interior friction plates, said lubricant passage being partially defined by a radial passage in at least one of said plurality of interior friction plates.

11. The clutch/brake drive according to claim 1 wherein, said first plurality of friction plates comprise a first plurality of exterior friction plates and a first plurality of interior friction plates, said second plurality of friction plates comprise a second plurality of exterior friction plates and a second plurality of interior friction plates, said lubricant passage being defined by a first radial passage in at least one of said first plurality of exterior friction plates and a second radial passage in at least one of said second plurality of exterior friction plates.

12. The clutch/brake unit according to claim 11 wherein, said lubricant passage is partially defined by a first axial passage in at least one of said plurality of first interior friction plates and a second axial passage in at least one of said plurality of second interior friction plates.

13. The clutch/brake drive according to claim 1 wherein, said first plurality of friction plates comprise a first plurality of exterior friction plates and a first plurality of interior friction plates, said second plurality of friction plates comprise a second plurality of exterior friction plates and a second plurality of interior friction plates, said lubricant passage being defined by a first axial passage in at least one of said first plurality of interior friction plates and a second axial passage in at least one of said second plurality of interior friction plates.

\* \* \* \* \*

UNITED STATES PATENT AND TRADEMARK OFFICE
CERTIFICATE OF CORRECTION

PATENT NO. : 6,029,786

DATED : February 29, 2000

INVENTOR(S) : Gordon M. Sommer

It is certified that error appears in the above-identified patent and that said Letters Patent is hereby corrected as shown below:

Col. 2, line 3, delete "low" and substitute --flow-- therefor

Col. 3, line 17, after "located" insert --on--

Col. 4, line 42, delete "spine" and substitute --spline-- therefor

Col. 4, line 43, "22" should be --22'--

Col. 4, line 54, "20' and 22'" should be --20, 20' and 22, 22'--

Col. 4, line 58, "20" should be --20, 20'--

Col. 4, line 61, "20" should be --20, 20'--

Col. 4, line 62, "22" should be --22, 22'--

Col. 4, line 63, "22" should be --22, 22'--

Col. 5, line 22, "20" should be --20, 20'--

Col. 5, line 33, "20, 22' and 22'" should be --20, 20' and 22, 22'--

Col. 5, line 65, after "located" insert --on--

Col. 6, line 19, "20" should be --20'--

Col. 7, line 31, "20 and 22" should be --20, 20' and 22, 22'--

Col. 7, line 33, "20" should be --20, 20'--

Col. 7, line 36, "20" should be --20, 20'--

UNITED STATES PATENT AND TRADEMARK OFFICE
CERTIFICATE OF CORRECTION

PATENT NO. : 6,029,786

DATED : February 29, 2000

INVENTOR(S) : Gordon M. Sommer

It is certified that error appears in the above-identified patent and that said Letters Patent is hereby corrected as shown below:

Col. 7, line 37, "22" should be --22, 22'--

Col. 7, line 41, "22" should be --22, 22'--

Col. 7, line 42, delete "its" and substitute --it-- therefor

Col. 7, line 44, "22" should be --22, 22'--

Signed and Sealed this

Eighth Day of May, 2001

*Attest:*

NICHOLAS P. GODICI

*Attesting Officer*  *Acting Director of the United States Patent and Trademark Office*